(No Model.)
F. LIGHTFOOT.
CLIP FOR VEHICLES.
No. 262,546. Patented Aug. 8, 1882.
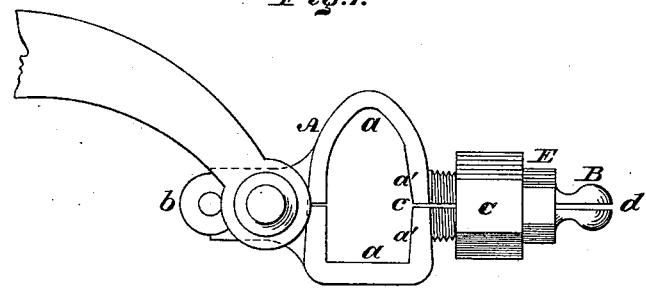
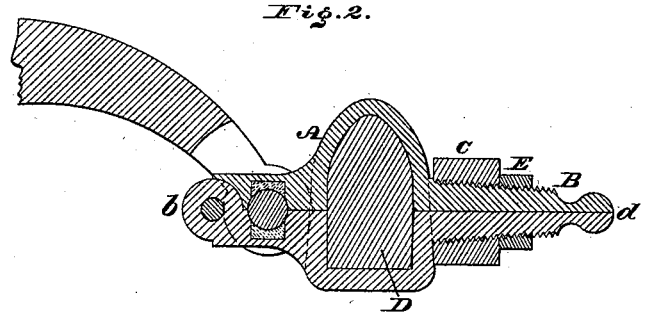
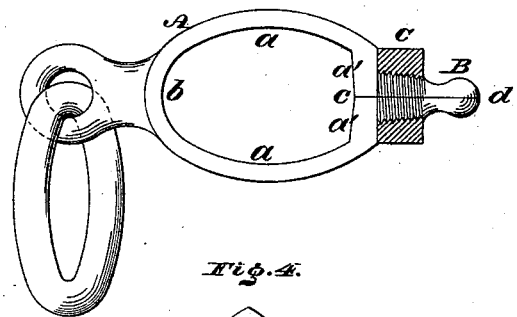
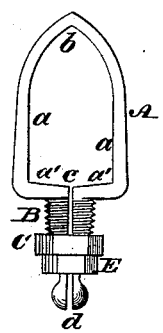
WITNESSES:
A. P. Grant,
N. F. Kircher
INVENTOR:
Francis Lightfoot,
BY John A. Wiedersheim ATTORNEY.
N. PETERS, Photo-Lithographer, Washington, D. C.

UNITED STATES PATENT OFFICE.

FRANCIS LIGHTFOOT, OF MEDIA, ASSIGNOR OF ONE-HALF TO JAMES M. PRICE, OF LANSDOWNE, AND BENJAMIN H. LIGHTFOOT, OF ALLEGHENY, PENNSYLVANIA.

CLIP FOR VEHICLES.

SPECIFICATION forming part of Letters Patent No. 262,546, dated August 8, 1882.

Application filed March 18, 1882. (No model.)

*To all whom it may concern:*

Be it known that I, FRANCIS LIGHTFOOT, a citizen of the United States, residing at Media, in the county of Delaware, State of Pennsylvania, have invented a new and useful Improvement in Clips for Vehicles, which improvement is fully set forth in the following specification and accompanying drawings, in which—

Figures 1, 3, and 4 are side elevations of clips embodying my invention, Figure 3 being partly sectional. Fig. 2 is a central longitudinal section of Fig. 1.

Similar letters of reference indicate corresponding parts in the several figures.

My invention consists of a clip having a divided stem which is conical and threaded, and in which is fitted a climbing-screw, whereby the clip may be powerfully and securely clamped to the axle or other portion of a vehicle, tile, &c.

Referring to the drawings, A represents the clip, which is formed of the jaws $a\ a$, hinged or connected at one end, $b$, and separated at the other end, as at $c$.

B represents the stem of the clip, the same being divided, as at $d$, forming two parts, which are respectively formed with the jaws $a\ a$, and it is of conical form and threaded, the narrow part being at its outer end.

C represents a nut having a conical opening the threads whereof conform to those of the stem B.

The clip is of such dimensions that when it is fitted on one axle-shaft or piece, D, where it is serviceable, it hugs the same snugly and the parts of the stem remain separated, as in Figs. 1 and 4, owing to the thickness of the piece D preventing closing contact of said parts. The nut C is then applied to the stem, and as it is rotated it climbs on the stem and gradually brings the two parts thereof together, whereby the jaws $a\ a$ pinch the piece D and sink thereinto, thus causing a biting action of the jaws, the effect whereof is the powerful and secure clamping and connection of the clip and piece, the nut being in position shown in Figs. 2, 3, and 4. A jam-nut, E, having a threaded opening of conical form, is screwed in the stem, and, abutting against the nut C, holds the latter immovable, and thereby prevents separation of the stem, and consequently the opening of the clip. The inner faces of the portions of the jaws with which the sections of the stem adjoin are inclined, as at $a'$, so that when the jaws are closed by the nut C there is a wedging action of said faces on the piece D, thus causing an increased biting and holding power of the clip on said piece.

Having thus described my invention, what I claim as new, and desire to secure by Letters Patent, is—

1. The clip A, having the inclined faces $a'$ for wedging action and provided with a divided stem and the tightening-nut, combined and operating substantially as and for the purpose set forth.

2. Clip A, having the inclined faces $a'$ for wedging action, and provided with divided tapering screw-threaded stem B, in combination with nut C, having a tapering bore, so that it will climb on said stem and cause the clip to bind on the axle, substantially as shown.

FRANS. LIGHTFOOT.

Witnesses:
JOHN A. WIEDERSHEIM,
A. P. GRANT.